US010956535B2

(12) United States Patent
Seide et al.

(10) Patent No.: US 10,956,535 B2
(45) Date of Patent: Mar. 23, 2021

(54) OPERATING A NEURAL NETWORK DEFINED BY USER CODE

(71) Applicant: Microsoft Technology Licensing, LLC, Redmond, WA (US)

(72) Inventors: Frank Torsten Bernd Seide, Bellevue, WA (US); Ryota Tomioka, Cambridge (GB); Wilhelm Richert, Munich (DE); Bruno S Bozza, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 772 days.

(21) Appl. No.: 15/624,115

(22) Filed: Jun. 15, 2017

(65) Prior Publication Data

US 2018/0336461 A1 Nov. 22, 2018

Related U.S. Application Data

(60) Provisional application No. 62/509,514, filed on May 22, 2017.

(51) Int. Cl.

| | |
|---|---|
| ***G06N 3/04*** | (2006.01) |
| ***G06N 3/10*** | (2006.01) |
| ***G06F 17/16*** | (2006.01) |
| ***G06N 3/08*** | (2006.01) |
| ***G06F 9/46*** | (2006.01) |

(52) U.S. Cl.

CPC ................ *G06F 17/16* (2013.01); *G06F 9/46* (2013.01); *G06N 3/0445* (2013.01); *G06N 3/084* (2013.01); *G06N 3/105* (2013.01); *G06N 3/0481* (2013.01)

(58) Field of Classification Search

CPC ......... G06F 17/16; G06F 9/46; G06N 3/0445; G06N 3/084; G06N 3/105; G06N 3/0481

See application file for complete search history.

(56) References Cited

U.S. PATENT DOCUMENTS

| | | | |
|---|---|---|---|
| 9,620,145 | B2 | 4/2017 | Bacchiani et al. |
| 2015/0363688 | A1 | 12/2015 | Gao et al. |

FOREIGN PATENT DOCUMENTS

| | | |
|---|---|---|
| WO | 2016145379 A1 | 9/2016 |

OTHER PUBLICATIONS

Neubig, et al., "DyNet: The Dynamic Neural Network Toolkit", In Journal of Computing Research Repository, Jan. 2017, pp. 1-33.

Bradbury, James, "Recursive Neural Networks with PyTorch", https://devblogs.nvidia.com/parallelforall/recursive-neural-networks-pytorch/, Published on: Apr. 9, 2017, 11 pages.

(Continued)

*Primary Examiner* — Austin Hicks

(74) *Attorney, Agent, or Firm* — Shook, Hardy & Bacon L.L.P.

(57) ABSTRACT

Disclosed in some examples are methods, systems, machine-readable media, and devices which operate a neural network defined by user code. A method includes identifying, operations from user code that are integral in operating the neural network, combining a subset of the identified operations into a single processing sequence to be transmitted to an array of hardware processors, performing operations that are not integral in operation of the neural network in a separate thread of execution from the operations that are integral in operating the neural network; and mapping results to the combined operations that were included in the single processing sequence.

18 Claims, 10 Drawing Sheets

800

GENERATE_MODEL(X);

PROCESS_LAYER();

GET_VALUE(L,3);

BACK_PROP(X);

810

820

PROCESSING GROUP A

840

FIBER A

830

PROCESSING GROUP B

850

FIBER B

(56) References Cited

OTHER PUBLICATIONS

Looks, et al., "Deep Learning with Dynamic Computation Graphs", In Journal of Computing Research Repository, Feb. 2017, pp. 1-12.
"The Microsoft Cognitive Toolkit", https://www.microsoft.com/en-us/cognitive-toolkit/, Retrieved on: May 15, 2017, 3 pages.
Dean, et al., "Large Scale Distributed Deep Networks", In Proceedings of the 25th International Conference on Neural Information Processing Systems, Dec. 3, 2012, pp. 1-11.

OPERATING A NEURAL NETWORK DEFINED BY USER CODE

CROSS-REFERENCE TO RELATED APPLICATIONS

This application claims the benefit of priority to U.S. Provisional Pat. App. No. 62/509,514, titled "LAZY TRAINING A NEURAL NETWORK DEFINED BY USER CODE" and filed May 22 2017, the disclosure of which is hereby incorporated by reference in its entirety.

BACKGROUND

Training a neural network typically includes a tremendous number of mathematical calculations. As neural networks increase in size and complexity using an increased number of training sets of data, the number of associated calculations needed to train the neural network increases exponentially.

In some scenarios, an array of processors are utilized to perform the calculations. However, because a neural network is often trained by propagating calculations through the neural network, subsequent operations must wait for results of previous ones. Accordingly, the operations that perform the propagated calculations are not readily parallelized.

In other examples, a neural network is defined, trained, and applied by user code. Considering the technical complexity of parallelizing the training and operation of a neural network, a user may or may not arrange or combine operations in an efficient manner.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
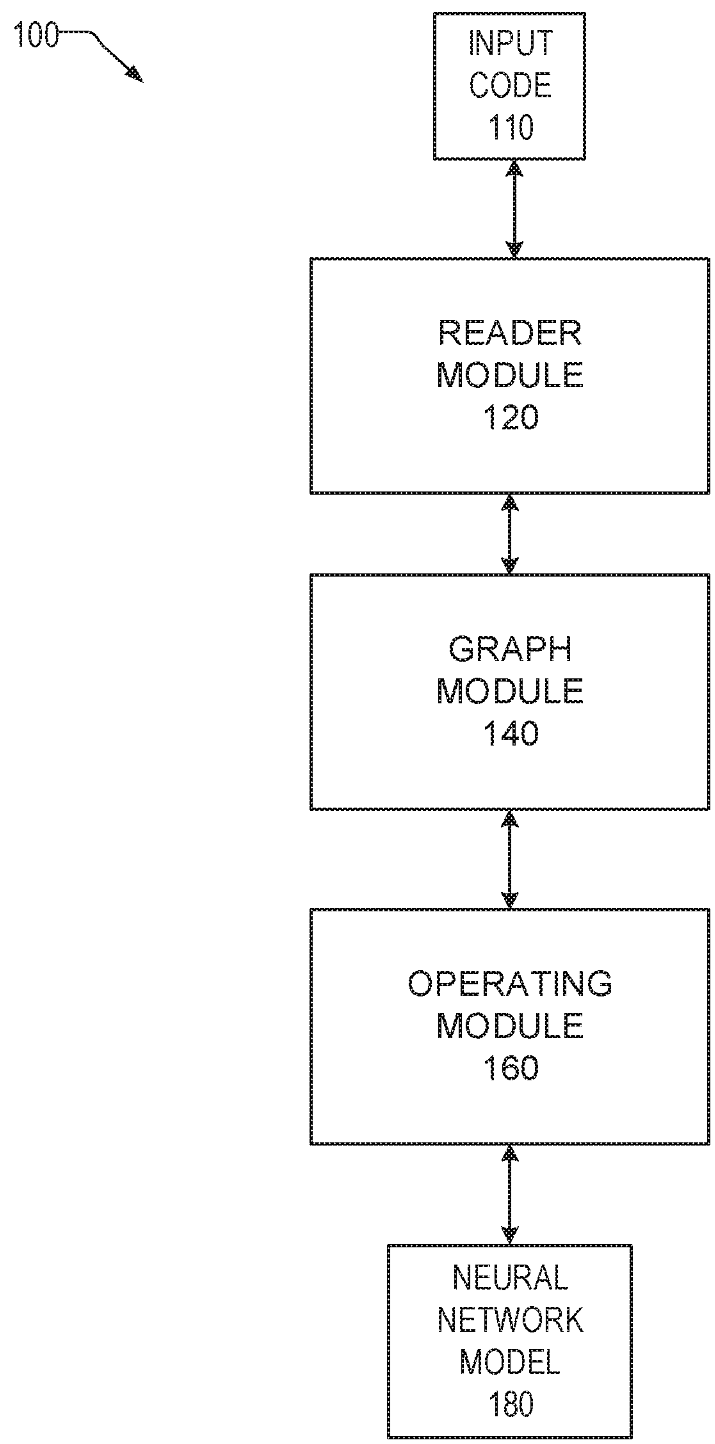
FIG. 1 shows a block diagram of a system for operating a neural network, according to an example of the present disclosure.

The idea solves an apparent conflict in approaches of writing tools for training and using neural networks. Training deep neural networks computes gradients (of a loss function with respect to the model parameters). This commonly uses "automatic differentiation" (AD). AD represents the network formula as a graph, where each operation in the formula is represented as a graph node. This way, one can compute any gradient between two points of the graph by means of the chain rule, as long as code exists to compute the gradient for each individual node type. AD composes these individual gradients into the desired quantity.

Existing tools like CNTK, Theano, and Google's TensorFlow represent graphs as static graphs that are created once and used many times. This allows to perform sophisticated optimizations on the graph, the most critical being to batch multiple training samples into "batched" (single-instruction-multiple-data) operations that maximize efficiency of graphic processing units. This is called "minibatching." This approach, however, prohibits a wide range of problem classes that require the graph to be different for each use—"dynamic networks".

Alternatively, the graph can be built anew, on the fly, for each use case. This approach is Turing-complete. Also, since user code is directly run each time like any program, the full type system of the programming language can be used. In comparison, the static-graph approach sort-of constitutes its own hidden programming language that makes implementation of advanced algorithms hard. However, the order in which the graph is built by typical user code prohibits automatic mini-batching.

Automatic mini-batching refers to the technique of replacing many individual operations (e.g., matrix-vector products) by a single batched operation (say. a matrix-matrix product, where the second matrix consists of many vectors batched together). This technique improves performance by an order of magnitude or more.

The various embodiments disclosed herein allow linear user code yet still enable automatic mini-batching. In certain embodiments, examples include evaluating operations in the user code and deferring execution for those operations that are not integral in operating the neural network (e.g., inspection operations, output operations, etc.). Also, an algorithm transforms a graph consisting of many independent mini-batch item's formula sub-graphs into a small number of parallel batched operations. In this way, a technique allows user code to see values of independent mini-batch items with an illusion of immediate computation, while still allowing automatic batching.

Many different embodiment are described relating to efficient arrangement of calculations for managing the training of a neural network. In certain embodiments, a user application is provided allowing a user to configure or perform other operations using a neural network. In such an embodiment, the user is allowed to organize a neural network with various arrangements of inputs, outputs, neurons, layers, or the like. However, as will be described herein, a user may or may not arrange the code or the neural network so that is can be efficiently trained. Due to the massive number of calculations (as well as dependencies between calculations) needed to train a neural network, such inefficiencies can result in significant training delays.

In some embodiments, a neural network operating system delays performance of user commands in order to more optimize training the neural network. For example, the user may request a result of such a command before the corresponding calculation is complete. In order to address this scenario, the neural network operating system 220 arranges the various calculations in quazi-threads and suspends certain threads corresponding to user queries until threads performing the training calculations are ready to respond.

In one example, a user designs and trains a neural network, using a graphical user interface, by providing user code. The user code designates input layers, interior hidden layers, and output layers. The user code may also train the neural network, apply the neural network, or perform other operations related to the neural network.

In an example embodiment, the neural network operating system executes user code lines independently, one after another. If user code requests a value within the neural network in the middle (e.g., before additional training calculations), automatic batching has not seen the full graph yet and therefore won't be able to effectively arrange operations. The neural network operating system 220 then suspends the user code inside the request, creates a new thread of execution with the next set of data values and suspends it as well. This is repeated until all of the threads are either suspended or done. After the threads are completed, all knowable graph values are known and the neural network operating system 220 batch-computes and unsuspends the threads.

Regarding the massive number of calculations, the neural network operating system 220 arranges a graph representing a portion of the neural network such that multi-dimensional mathematical calculations may be performed concurrently. In one example, a set of vector/vector products are reformed into a matrix/vector product. In other examples, the dimensions of the vectors do not exactly match and the neural network operating system 220 adds buffer data to assist in aligning groups of calculations as will be further described.

Accordingly, the neural network operating system 220 efficiently trains a neural network by analyzing user commands, arranging or reordering numerical calculations, and prioritizing execution of certain operations. In this way, the neural network operating system 220 improves the functioning of a computer system by training and implementing a neural network in a reduced amount of time as compared with prior systems.

In certain embodiment, the neural network is trained to apply to: Computer vision, content moderation, emotion recognition, facial recognition, video analysis, speech recognition, custom recognition, image classification, common objects in common detection and/or segmentation, age determination, caption generation, identify verification, or the like. Of course, one skilled in the art may recognize other applications of such a neural network and this disclosure is not limited in this regard.

As one skilled in the art may appreciate, a neural network is an electronic networks of "neurons" based on the neural structure of the brain. A neural network processes input data sets, and "learns" by comparing their classification of the data set with the known actual classification of the data set. Errors from the initial classification of each data set is fed back into the network, and used to modify the networks algorithm for subsequent iterations.

As described herein, a neuron is a simple pattern detector that learns how well input data correlate with synaptic weights. In one example, a neuron is configured to use a sigmoid function to determine the output of the neuron. The output of a neuron may be given where $h_i$ is the output of the neuron applying a sigmoid function (a) to a summation of weight multiplied by inputs ($x_j$) associated with the weights ($w_{ij}$) with a bias ($b_j$).

$$h_i=\sigma(\Sigma_j w_{ij}\cdot x_j+b_j)$$

In one example, neurons are organized into layers within the neural network. An input layer includes inputs to the neural network. The neural network may also include one or more hidden layers and an output layer.

In general, a neural network is trained by inputting a data set into the input layer of the neural network and comparing the output with the known expected output for that data set. Error (e.g., a numerical gap between the current output of the neural network and the known correct output for the data set). The errors are then used to adjust the weights in the hidden layer so that, in subsequent iterations, the output values will be closer to the "correct" values.

The neural network processes the records in the training data one at a time, using the weights and functions in the hidden layers, then compares the resulting outputs against the desired outputs. Errors are then propagated back through the system, causing the system to adjust the weights for application to the next record to be processed. This process repeats as the weights are repeatedly tweaked. During the training of a network the same set of data is processed many times as the connection weights are refined.

In one example, a summation of weights is represented as follows depicting a two-dimensional array of weights (e.g., a matrix) represented by a one dimensional array of patterns. In this example, the set of operations depicted may be performed by a single matrix operation.

$$W^x=\begin{pmatrix} w_{11}, & w_{12}, & \dots & w_{1N} \\ w_{21}, & w_{22}, & \dots & w_{2N} \\ & \dots & & \\ w_{M1}, & w_{M2}, & \dots & w_{MN} \end{pmatrix} x = \begin{pmatrix} \text{pattern}_1 \\ patern_2 \\ \dots \\ \text{pattern}_N \end{pmatrix} x$$

In such an array of weights representing a layer in a neural network, the number of rows may represent a number of inputs to the layer and a number of columns may represent a number of neuron in the layer. The matrix products that will be discussed herein, at least include assembling multiple single column outputs for the layer having a number of rows consistent with the number of outputs into a single matrix representing multiple outputs. Furthermore, this may be done with vector calculations assembled from different layers within a neural network.

Of course, such products are not limited to two dimensions as the same methods and algorithms described herein may also apply to three dimensions or more as a skilled mathematician may appreciate.

In other example embodiments, equations that govern the calculations within a neuron include a first neuron (h(1)) whose output is determined by applying a sigmoid function to the weight (W(1)) for a neural network input (x) and an added bias (b(1)). The equation for a second neuron (h(2)) that receives the output of h(1) as an input is given by applying a sigmoid function to this neuron's weight (W(2)) multiplied by the output of h(1) and an added bias (b(2)) as follows:

$$h^{(1)}=\sigma(W^{(1)}x+b^{(1)})$$

$$h^{(2)}=\sigma(W^{(2)}x+b^{(2)})$$

In this example, a collection of vectors of weights included in the neuron equations may be given by:

$$w^{(1)}=\begin{pmatrix} patern_1 \\ \text{pattern}_2 \\ \dots \\ \text{patt}ern_N \end{pmatrix}$$

-continued $$w^{(2)} = \begin{pmatrix} \text{abstract pattern}_1 \\ \text{abstract pattern}_2 \\ \ldots \\ \text{abstract pattern}_N \end{pmatrix}$$

In another example embodiment, the equation for a neuron (h(t)) includes a time variable (t) such that an input to the neuron is based on output of the neuron (11(t−1)) from a previous iteration. In this example, such a set of neuron form a recurrent neural network.

$$h(t)=\sigma(Wx(t)+Rh(t-1)+b)$$

In another example embodiment, the neural network operating system 220 is implemented as part of a software application allowing users to configure their own neural networks. An example application includes an interface allowing a user to enter executable code for setting up, training, or otherwise manipulating the neural network.

As previously described, training a neural network includes a large volume of mathematical calculations. In order to perform the calculations, in one example embodiment, the neural network operating system 220 arranges the calculations in various ways as described herein and sends them to an array of processors for processing. In one example, the array is a massively paralleled super computer using graphic processing units (GPU's) as one skilled in the art may appreciate.

In one example embodiment, the neural network operating system 220 batches calculations for layers of the neural network and combines one or more matrix-vector products into one matrix-matrix product. In this way, the neural network operating system 220 converts a plurality of mathematical operations into a single matrix product to be transmitted to the array of processors. In one example, the neural network operating system 220 batches N (eg., 256) samples and executes the batch in lockstep.

In another example embodiment, the neural network operating system 220 serializes calculations regardless of layers and orders them according to how they depend on each other. For example, calculations with multiple dependencies are performed prior to calculations with fewer dependencies. Also, calculations may be automatically moved to be prior to another calculation that depends on it.

After serializing the calculations according to their dependency, the neural network operating system 220 may pack the various vector calculations into a larger matrix operation. The neural network operating system 220 may also add filler data to facilitate packing vectors with non-matching dimensions. For example, a vector of 9 values, a vector of 8 values, and a vector of 10 values may be combined by adding one filler value to the vector of 9 values and 2 filler values to the vector of 8 values so that each of the three vectors has a resulting dimension of 10. At this point, the neural network operating system 220 may combine the three vectors into a 3×10 matrix, in an example.

In an example where the neural network is a recurrent network, combining layers of the neural network for concurrent processing by them array of processors is not done in forward propagation because input values for some layers depend on output vales for previous layers. However, in back propagation, multiple layers may be combined and concurrently transmitted to the array of processors because inputs to the multiple layers are known. In another example embodiment, during forward propagation, a neuron's input includes the output from that same neuron, but at a previous iteration.

In one example embodiment, the neural network operating system 220 batches column and row vectors for one or more layers of the neural network. In a specific example, the neural network operating system 220 combines 20 row vectors in a two dimensional matrix of size 20 and uses that matrix in the single matrix operations resulting in a summation as previously described.

By combining many previously separate matrix operations into a single transmission to the array of processors, the array of processors performs all of the calculations without waiting for a subsequent transmission of calculations to be performed.

Furthermore, in another example embodiment, the neural network operating system 220 may cache a matrix to be used in an operation and apply the memory used by that same matrix in subsequent operations without having to reload the matrix for each subsequent operation. Without combining the operations, the neural network operating system 220 would have to load the matrix each time it is used in a calculation.

In another example embodiment, the neural network operating system 220 combines matrices that are not the same size. For example an array of weights is 20×20, but row values for inputs to a layer are 10, 5, and 4 which results in a combined size of 19. In this example, the neural network operating system 220 adds a filler row of values so that the set of vectors can be multiplied by the 20×20 matrix. In this way, the neural network operating system 220 combines calculations for multiple layers even when the addition of the multiple layers do not add up to the necessary number of values to be multiplied by a matrix of weights.

In one example embodiment, the neural network operating system 220 compares an amount of time saved by adding the filler row of values with an amount of time necessary to add and calculate the values in the filler row. In response to the time saved by adding the filler row being more than the time needed to add and calculate the values in the filler row, the neural network operating system 220 adds the filler row. Otherwise, the neural network operating system 220 does not add the filler values but saves the filler row for a subsequent combined operation.

In another example embodiment, a user using a programming interface, requests to perform some of the calculations, then requests one or more of the resulting values to be display or otherwise retrieved. Traditionally, the operations requested by the user cannot be combined with the operations after the retrieval request because the results of the calculations that must occur before the retrieval request must be calculated in order to satisfy the retrieval request (e.g., the retrieval request needs the value from the previous calculations). In an example, an output value is requested by the user to determine control flow by the application. Thus, the code may not continue until the retrieval is satisfied.

The neural network operating system 220 solves this problem by designating different programming threads for different purposes. For example, the neural network operating system 220 includes a main thread, and separate threads for the training calculations. In this way, the retrieval request is in a different thread than the main thread. Thus, training calculations specified before a retrieval operation and training calculations specified after the retrieval operation can be combined into a single matrix multiplication operation. The neural network operating system 220 then suspends the main thread until the calculations are complete. In this way, the calculation needed to satisfy the retrieval operation are completed, although the user waits for the subsequent training calculations to be completed because they are combined with the training calculations that were specified before the retrieval operation. In this example, an application being used by a user behave as though the retrieval operation had completed although the actual operation does not complete until all training calculations that are combined with those specified before the retrieval operation are complete.

In another example embodiment, each combination of training calculations are included in their separate threads. As described herein, a programming thread may or may not include an operating system thread, and may also include "fibers," or other thread-like objects in application space or that are otherwise available to the neural network operating system 220.

In one example embodiment, the neural network operating system 220 employs a specific number of threads (eg., 20). The neural network operating system 220 adds combinations of training calculations to each of the threads and they are then transmitted to the array of processors. After all of the threads are complete, and waiting retrieval operations can be performed, the neural network operating system 220 then determines a next set of training calculations and populates the threads accordingly. This is one example of cooperative multithreading as one skilled in the art may appreciate.

In certain examples, the threads are limited to fibers such that the threads do not consume limited operating system resources, interrupts, kernel space, but rather populate memory and switch a stack pointer to the new area of memory.

Furthermore, in another example embodiment, the neural network operating system 220 allows a user to configure optimizations using the programming interface and optimizes the user's code. Thus, if a user desires other more specific optimizations, they may be coded into the programming interface and the neural network operating system 220 does not preclude their optimizations. In another example embodiment, the user interface allows the user to flag certain sections of code that the neural network operating system 220 does not evaluate thus allowing the user greater control in how the neural network operating system 220 evaluates and arrange the execution of operations.

In one example embodiment, the neural network operating system 220 preconfigures a set of multi-dimensional arrays to receive training calculations. According to a user's selections of a preconfigured array, the neural network operating system 220 optimizes the training calculations using the preconfigured array. In one example, a preconfigured array has 20 rows and 20 columns and the neural network operating system 220 has predetermined how to divide up the calculations among the array of processors. In this way, the neural network operating system 220 has a priori knowledge of a more optimal way to parallelize the training calculations without having to compute them for each iteration. In another way, the neural network operating system 220 uses two or more preconfigured arrays by populating one array and using it to transmit the values to the array of processors and, while waiting for the results, populates the second array. In such a double-buffering scenario, the neural network operating system 220 more optimally perform the calculations using the array of processors with two or more pre-configured multi-dimensional arrays.

In another example embodiment, the neural network operating system 220 employs arena allocation to allocate memory needed to set up the training calculations (e.g., sufficient storage to store the combined operations). Specifically, the neural network operating system 220 evaluates a graph to determine memory•requirements and uses a contiguous array to represent the graph, then bulk-allocates the memory sufficient to store the entire array as slice views into that arena.

In another example embodiment, the neural network operating system 220 reduces communication (e.g., transmission to an array of processors) using 1-bit Stochastic Gradient Descent. In this example embodiment, the neural network operating system 220 quantizes gradients to 1 bit per value and carries over the quantization error to subsequent mini-batches.

In one example embodiment, the neural network operating system 220 automatically sizes memory to more efficiently manipulate the matrices or performs block momentum for effective parallelization by combining model averages with error-residual data-parallel training.

FIG. 1 shows a block diagram of a neural network operating system, according to one example of the present disclosure. In one example embodiment, the neural network operating system includes input code 110, a reader module 120, a graph module 140, an operating module 160, and a resulting neural network model 180.

In one example embodiment, the input code 110 is user generated code that configured, organizes, specifies, trains, and/or operates a neural network. The input code 110 may be received via a user interface as described herein. For example, the neural network operating system 220 may present a graphical user interface to the user that includes a text input field for receiving user generated code. As one skilled in the art may appreciate, the input code 110 may be manipulated in many different ways via the graphical user interface and this disclosure is not limited in this regard.

The reader module 120 parses though the input code 110 to determine one or more operations whose execution may be suspended. In certain examples, such operations include values retrieval operations as previously described. Specific examples include, a get value operation, including an output value as a secondary calculation (e.g., one that is not directly related to the training or operation of the neural network model 180), or otherwise comparing a value to another value as part of a control flow decision. The reader module 110 may also deserialize tasks specified in the input code 110 and/or perform automatic randomization.

In other example embodiments, the reader module 120 groups user commands in the input code 110 into various processing groups according to readiness. For example, where all of the inputs for a given neural within a neural network have been calculated, then the neural is "ready" to perform its' internal calculations. Otherwise, the neuron is not "ready." Where a certain operation requires no inputs, the operation is always "ready." Where a certain operation's inputs are ready, then the operation is ready to be processed.

The graph module 140 initially assembles the neural network model according to the commands of the user. As indicated, the graph module 140 may include input layers, hidden layers, output layers, or others as one skilled in the art may appreciate. Furthermore, the graph module 140 may specify initial weights, neuron evaluation functions (e.g., model functions or criterion functions), or the like.

In another example embodiment, the graph module 140 analyzes the neural network model 180 to determine which training calculations may be combined. For example, where neural network includes two layers with eight neurons each, and the combination matrix includes sufficient operations to process both layers in a single operation, the graph module 140 combines the two layers.

The graph module 140 also perform the padding and filler data as previously described. For example, where a neural network includes two layers, one with seven neurons and the other with eight neurons, the graph module 140 may combine the two layers and add sufficient fill or padding operations to fill the combination matrix.

The operating module 160 manages the training of the neural graph module 180 in any of the ways described herein. In one example embodiment, the operating module 160 manages transmission of combined neural network training calculations to the array of processors.

In other example embodiments, the operating module 160 performed stochastic gradient descent in order to reduce error in the training data sets. The operating module 160 may also perform mini-batching as described herein.

In an exemplary workflow, the neural network operating system 220 prepares the training data, configures the reader module 120, trains the neural network, and publishes the resulting neural network model 180 via the Internet, or stores the resulting neural network model 180 in a file, or the like.

In one example embodiment, a method includes: determining operations (e.g., operations whose inputs are all computed) that are ready to compute, group the operations in batch groups (e.g., groups with similar dimensions); selecting a group for execution (e.g., a group with the largest batch size), executing the group; gathering all inputs and copy them into a tensor with a new batch dimensions: performing the single batched operation (e.g., a multidimensional product); determining which additional training calculation now have their inputs calculated and add those to a group to be executed; and repeating until there are no more pending training calculations.

Figure 2:
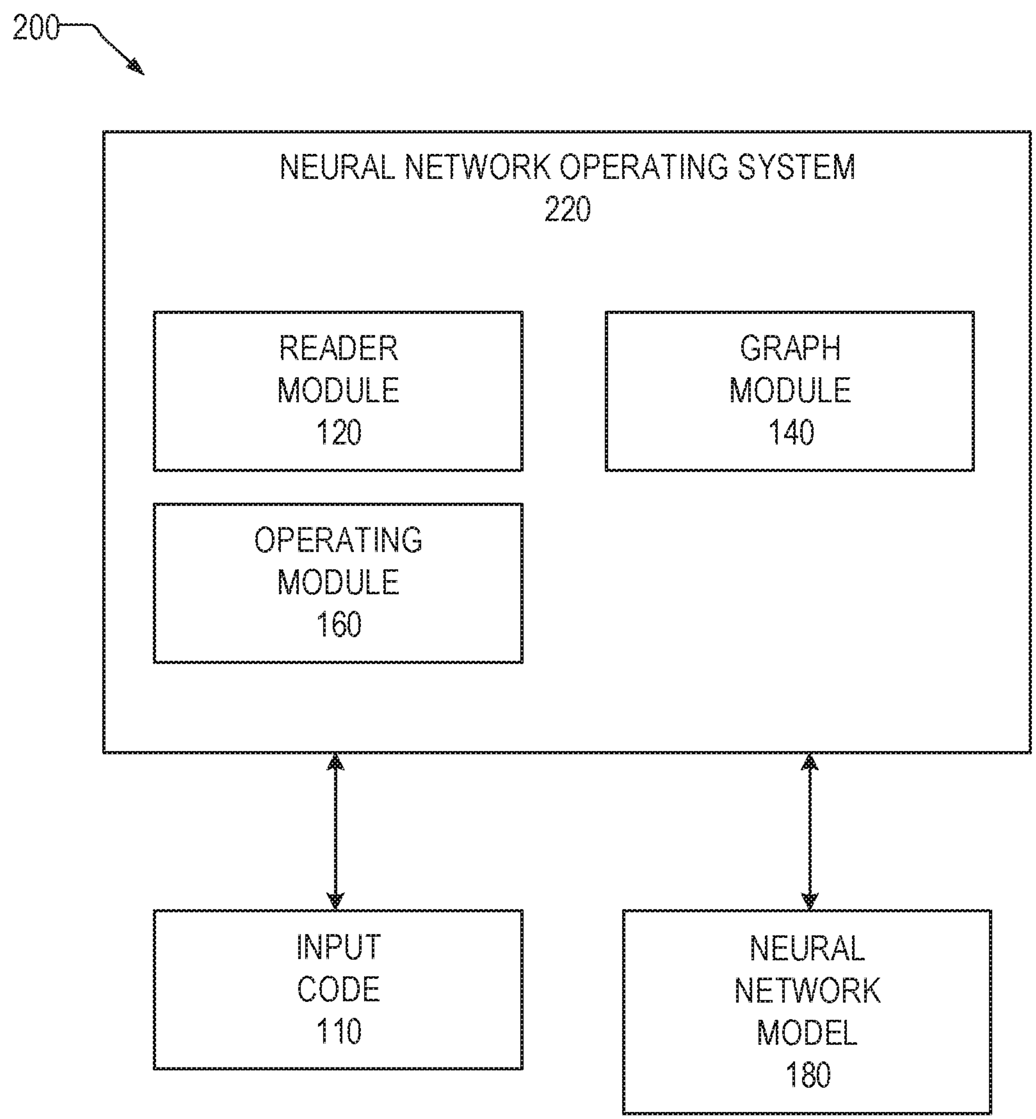
FIG. 2 is a block diagram of another system for operating a neural network, according to another example embodiment of the present disclosure.

FIG. 2 is a block diagram of another neural network operating system 200 for operating a neural network, according to another example embodiment of the present disclosure. In this example embodiment, the system 200 includes a neural network operating system 220, input code 110, and a neural network model 180. The neural network operating system 220 includes the reader module 120, the graph module 140, and operating module 160. The portions of the system 200 that are also depicted in FIG. 1 may or may not be substantially similar to those similar objects.

Figure 3:
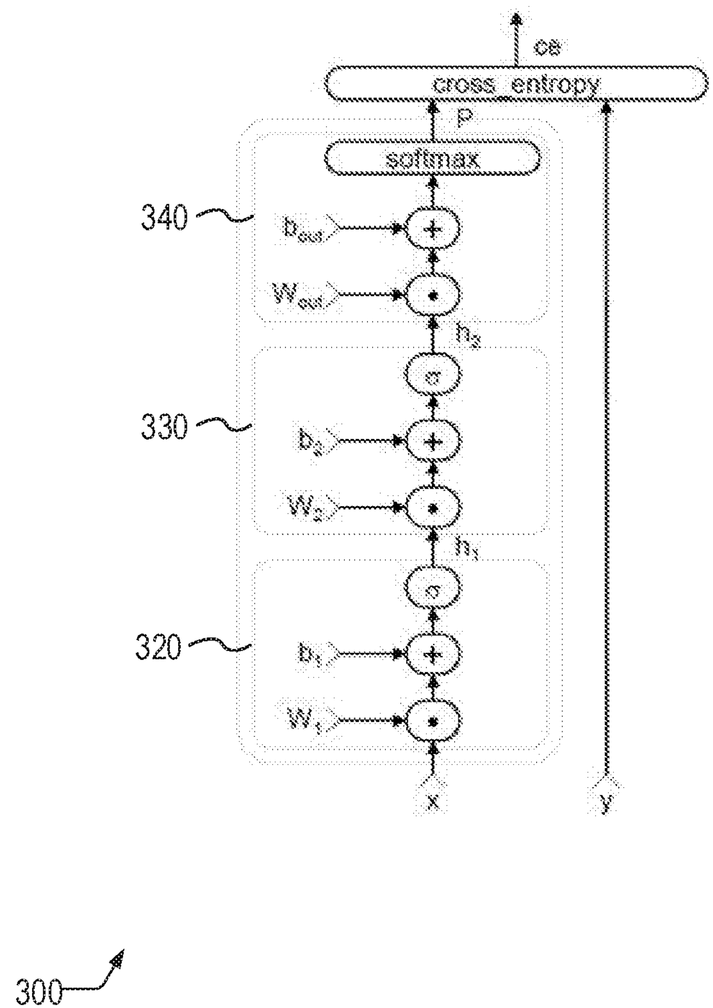
FIG. 3 is an illustration depicting one layer of a neural network, according to another embodiment of the present disclosure.

FIG. 3 is an illustration depicting one layer 300 of a neural network, according to another embodiment of the present disclosure. This particular layer 300 includes at least three neurons.

An input X is fed into neuron one 320, and neuron one 320 multiplies the input X by the $W_1$ and adds $b_1$ into the function of the neuron to generate an output value $h_1$. Then neuron two 330 has input $h_1$ and multiplies $h_1$ by $W_2$, adds $b_2$ and applies the neuron function to generate output values $h_2$, and combines that input value with $W_2$ and $b_2$ according to the evaluation function to generate an output value $h_2$. The neuron 340 receives input $h_2$, multiplies $h_2$ by $W_{out}$ and adds $b_{out}$.

Figure 4:
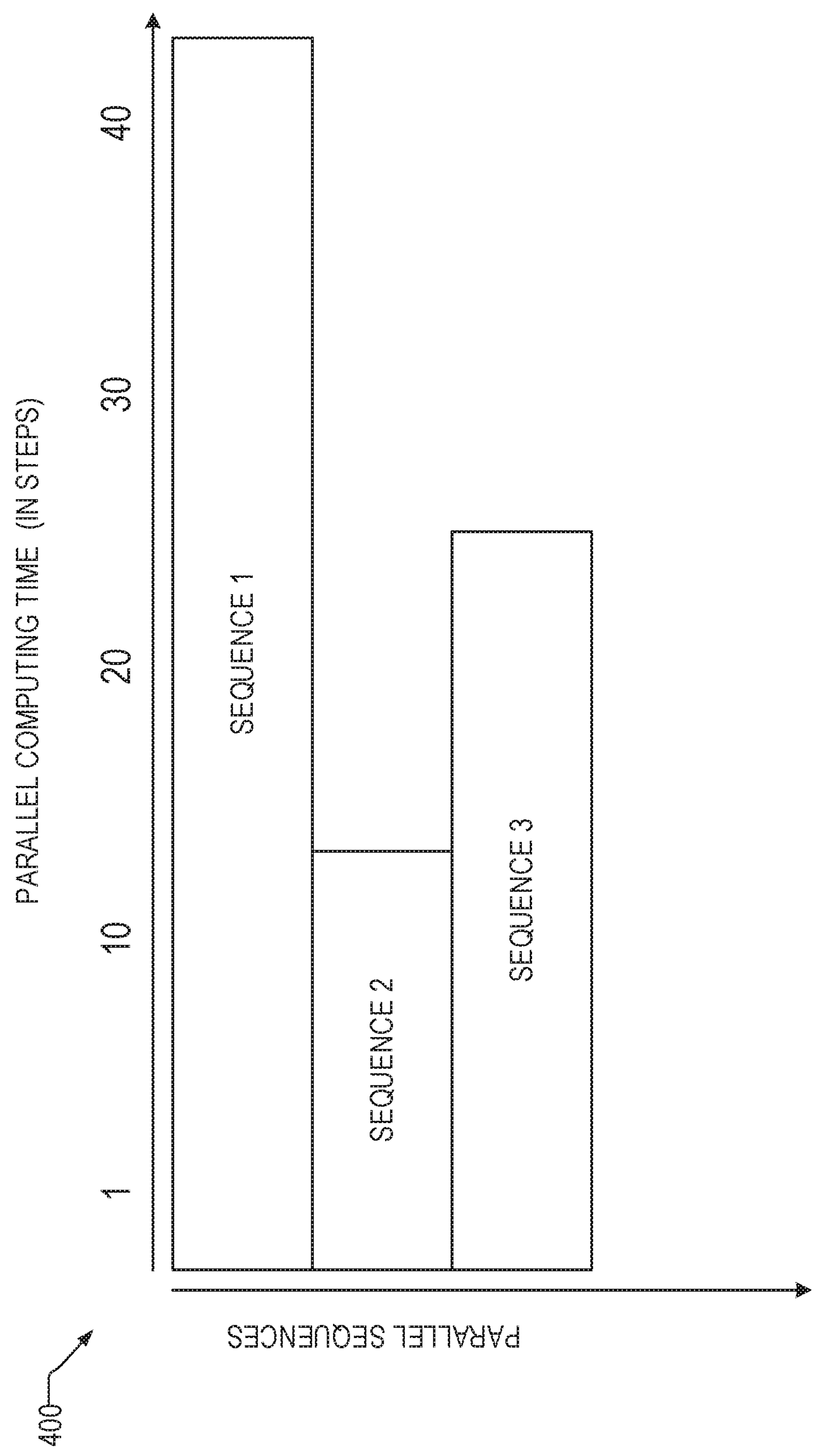
FIG. 4 is an illustration depicting a set of sequences according to an example embodiment.
Figure 5:
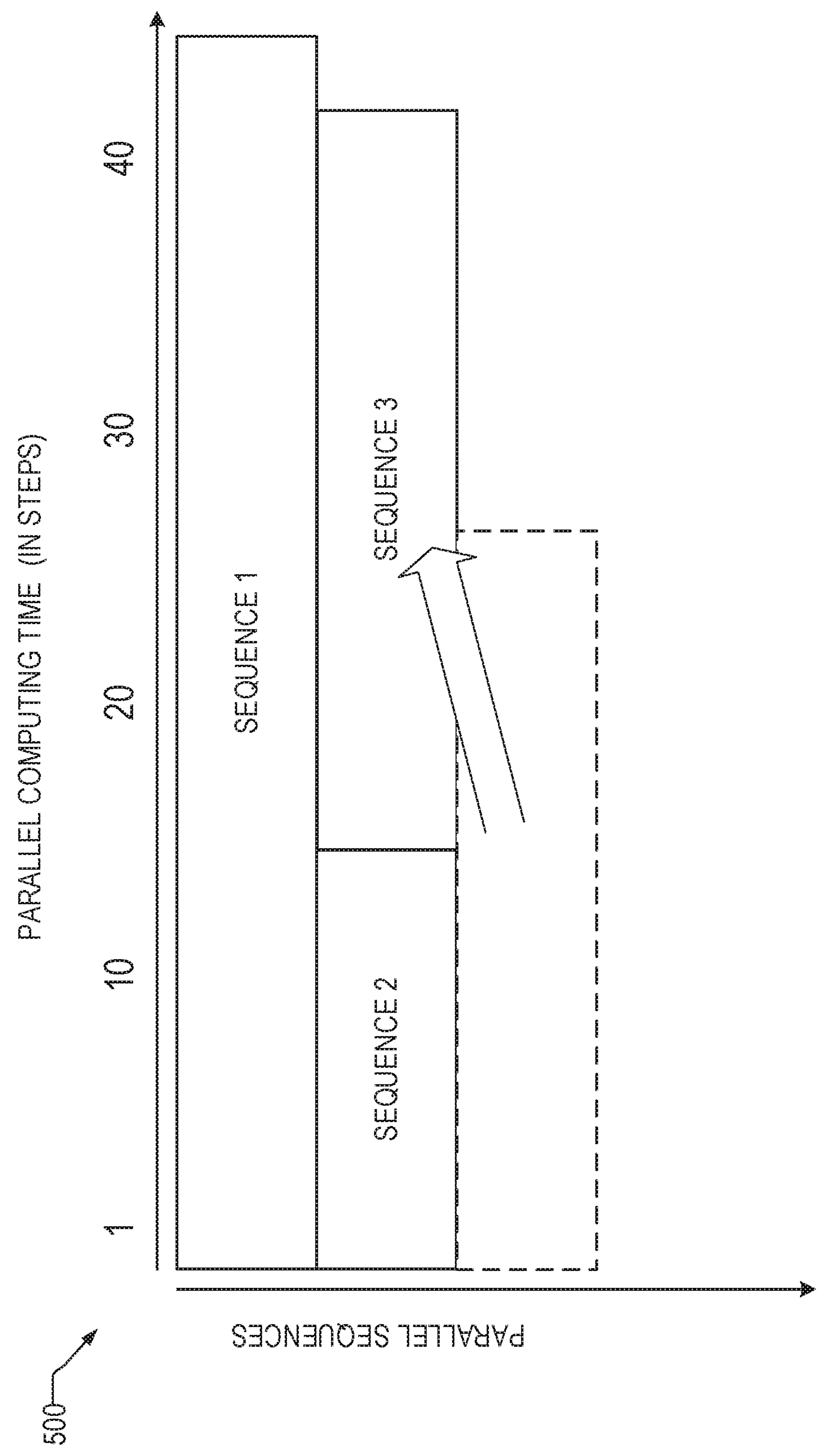
FIG. 5 is an illustration depicting a sequence combination according to another example embodiment.
Figure 6:
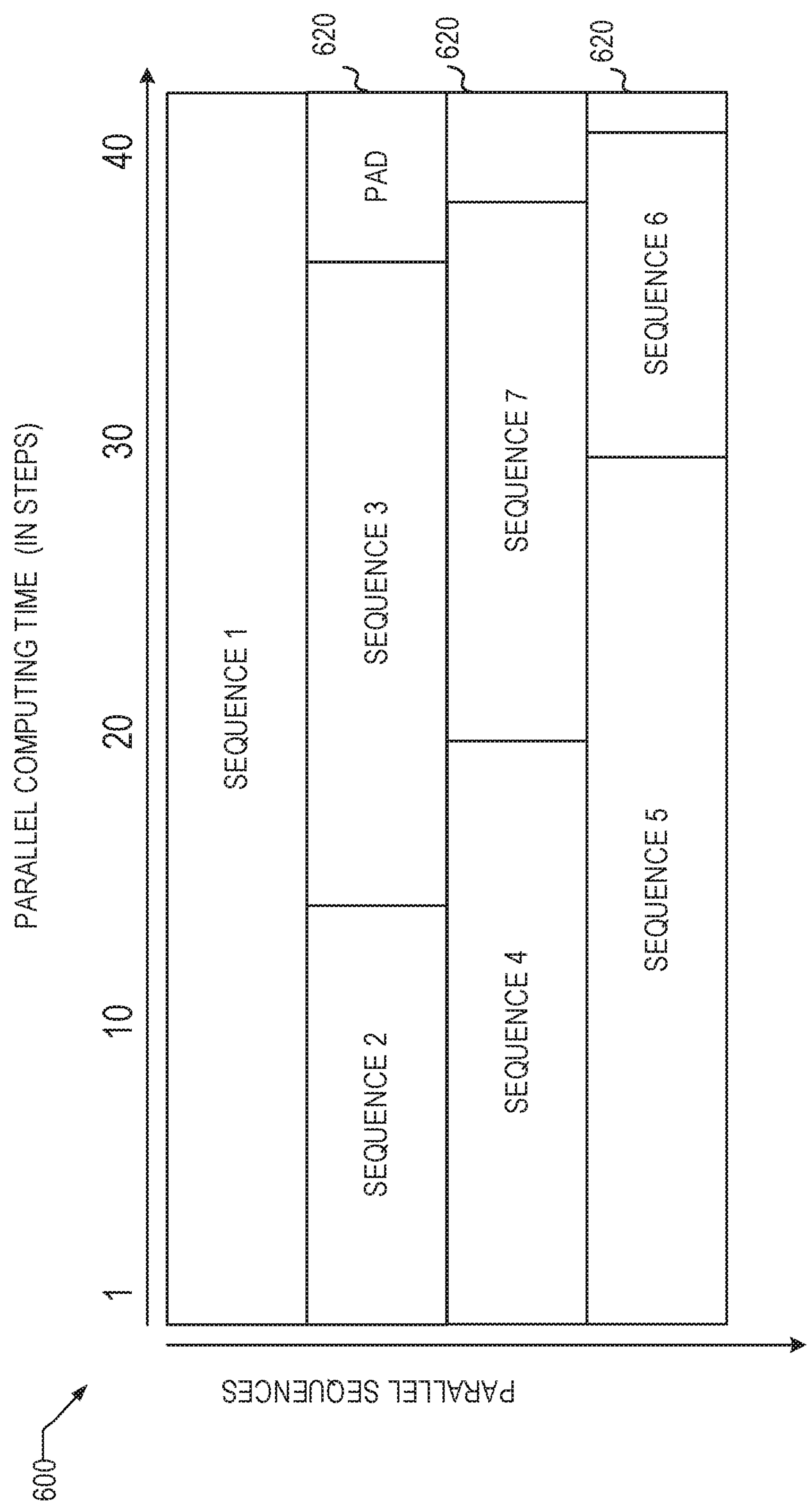
FIG. 6 is another illustration depicting a packed sequence according to an example embodiment.

FIG. 4 is an illustration depicting a set of sequences 400 according to one example embodiment. As illustrated in FIG. 4, different sequences representing training layer calculations may have different lengths. FIGS. 4-6 demonstrate how these different sequences are automatically and without user intervention, packed and padded for processing by the array of processors.

In certain examples (e.g., data sets from a training set of data), stochastic gradient descent uses a single example in each iteration while mini-batch gradient descent uses a larger number of examples in each iteration (e.g., propagation step). The number of examples, according to certain embodiments may range from 10 to 100, but of course, this is not necessarily always the case. Twenty examples is a non-limiting number of examples in a mini-batch. As described herein, using a batch size that is consistent (or close to), a number of neurons in a neural network layer, allows the neural network operating system 220 to combine input examples sufficient to fill a matrix thereby converting a matrix/vector operation into a matrix/matrix operation. Of course, such an application is not limited to two dimensions.

In traditional examples, a neural network operating system 220 resets state and gradients at sequence boundaries before the sequences are combined, however, according to an example embodiment, sequences are evaluated in parallel sequences computing time steps in parallel.

For example, parallel sequence 1 may include approximately 40 time steps. The sequence is transmitted to the array of processors. Next, parallel sequence 2 includes 12 time steps and sequence 2 is transmitted to the array of processors. Similarly, with parallel sequence 3. Such an approach is inefficient because parallel sequences 2 and 3 may be combined and simultaneously transmitted to the array of processors for processing. Thus the neural network operating system 220 need not wait for results of parallel sequence 2 before transmitting parallel sequence 3 to the array of processors.

FIG. 5 is an illustration depicting a sequence combination according to another example embodiment. As described relating to FIG. 4, because the combined number of time steps in parallel sequences 2 and 3 are still less than 40 (an arbitrary size of time steps), the neural network operating system 220 combines them and concurrently transmits both 2 and 3 to the array of processors.

In certain embodiments, the array of processors has a sufficient number of processors that each of the time steps may be computed by a different processor. Thus, transmitting any parallel sequence that is not full results in wasted processor cycles in the array of processors.

Furthermore, the neural network operating system 220 may combine parallel sequences that have different lengths and may also correctly reset state and gradients at sequence boundaries. A result of such combinations is that there are fewer sets of calculations ultimately transmitted to the array of processors accomplishing completion of the training calculations in less time.

FIG. 6 is another illustration 600 depicting a packed sequence according to one example embodiment. In this example embodiment, sequences 2 and 3 are combined. Furthermore, because sequences 4 and 5 are, in combination, larger than the size of the structure, they are not combined, but sequence 4 is combined with sequence 7 and sequence 5 is combined with sequence 6. Thus, the neural network operating system 220 calculates the sizes of the various parallel sequences and intelligently combines them to fill each parallel sequence.

Furthermore, the neural network operating system 220 constructs a memory structure having a static size (40 in this example). In response to a combination of parallel sequences that do not fill the memory, the neural network operating system 220 fills the remaining space with padding data. Adding padding data allows reuse of memory structures without memory reallocation.

In another example embodiment, the neural network operating system 220 determines an execution time needed to add the padding data to the parallel sequence and compares this execution time with an amount of time saved by combining the sequences into a single parallel sequence. In response to the time needed to add the padding data exceeding the time saved by combining the sequences, the graph module time does not combine the sequences. In response to the time needed to add the padding data not exceeding the time saved by combining the sequences, the graph module combines the sequences and adds the padding values.

Figure 7:
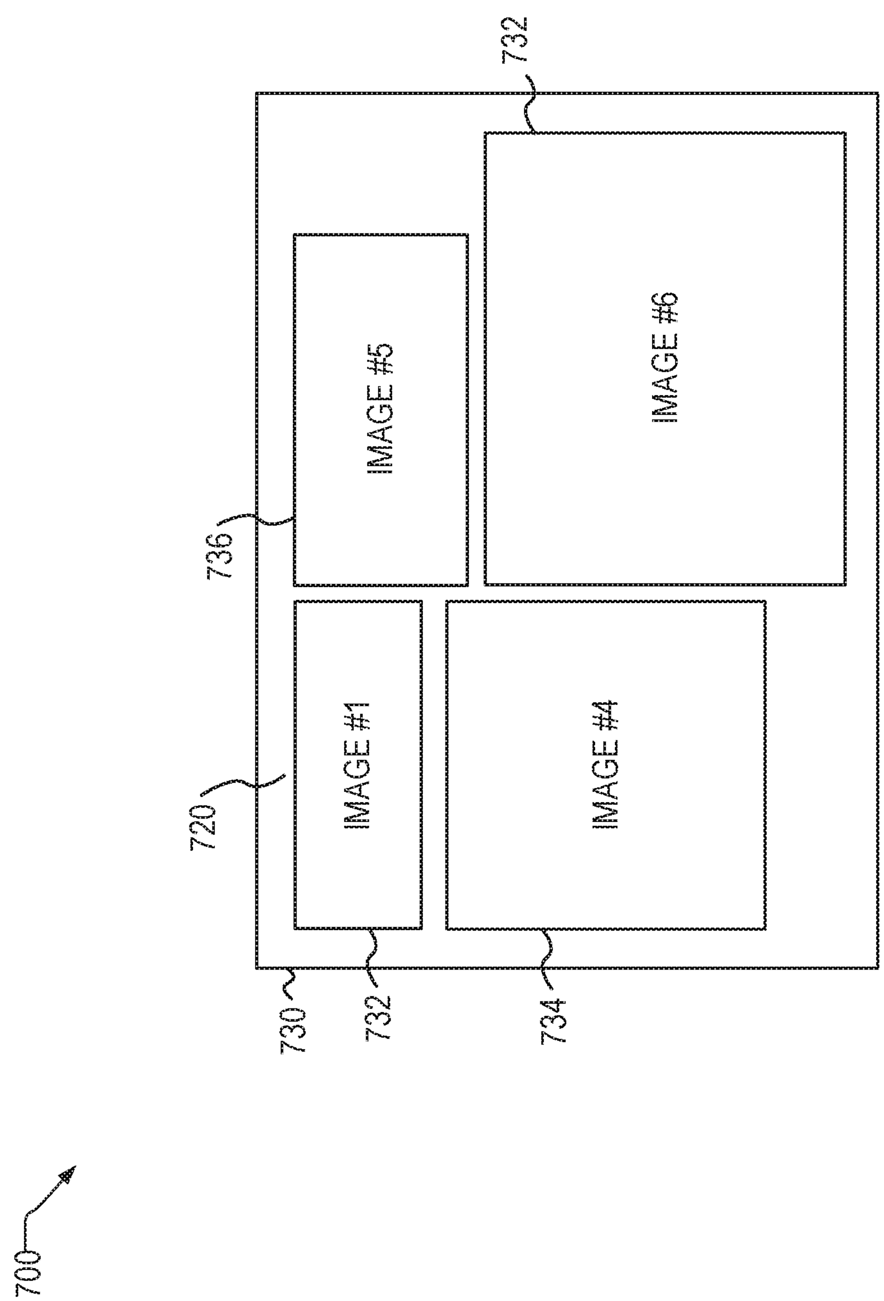
FIG. 7 is an illustration depicting combining operations for images, according to an example embodiment.

FIG. 7 is an illustration depicting combining operations for images, according to one example embodiment. Similarly, as with combining multiple vector calculations into a single matrix calculation, the neural network operating system 220 may also combine multiple images into a larger image. Thus, instead of repeatedly classifying each image separately, the neural network operating system may classify a plurality of images arranged in a larger two-dimensional space.

Prior to transmission to an array of processors, the neural network operating system 220, in one example embodiment, arranges the images and provides a border between the images. Thus, instead of processing one image at a time (e.g., at the array of processors), the neural network transmission system 220 may apply a single filter to the combined image space using a single command as opposed to multiple commands for the independent images. In this way, the neural network operating system 220 does not wait for the results of each image before transmitting more image data to the array of processors. This also, provides the neural network operating system 220 with additional time (e.g., the time needed by the array of processors to process the set of images), to construct a next set of images in the image space.

In other example embodiments, the neural network operating system 220 adjusts the size of the border to accommodate the filter being applied to the images. In one example, a filter processes 9 pixels in a block at a time. Thus, in this example embodiment, the neural network operating system 220 adjusts the size of the border to more than 3 pixels (e.g., a maximum height or width of the image filter being applied). In this way, the neural network operating system 220 ensures that image filter do not consider pixels from different images do not affect pixels in other images as a result of applying the filter.

In certain embodiments, the image filters are configured to emboss, apply a newsprint effect, charcoal effect, old film effect, edge detection, blurring, texture addition, glowing effect, color effects, brightness effects, contrast adjustments, sketch filter, adding graphical objects, spectral transformations, text effects, shadowing effects, or other modification or enhancement to an image as one skilled in the art may appreciate.

In another example embodiment, the neural network operating system 220 combined three dimensional arrays in a volume of space and similarly applies one or more algorithms to manipulate the data As described herein, a lazy evaluation at least includes, delaying execution of a user specified operation until the results of that user specified operation are requested by the user. Thus, the neural network operating system 220 can proceed optimizing and arranging training calculations that were ordered both before and after the user specified operation with little regard to the user specified operation. Thus, user specified operations that would ordinarily interrupt or prevent combining training calculations no longer have that effect.

In current traditional scenarios batching was the job of the user. Users would manually, in user code, collate multiple mini-batch items into N-dimensional arrays ("tensors") where one axis was a batch axis. This works fine for static scenarios (e.g. processing 200 independent images in parallel), but fails for dynamic networks where the actual operations performed on each mini-batch item are not the same, and may even depend on values that the network itself computes as it goes along.

In certain example embodiments, the neural network operating system 220 uses multi-threading for the specific scenario that a mini-batch item's code accesses the result of computation. At that point, the sub-graphs of the other mini-batch items has not been seen yet. As the neural network operating system 220 suspend the thread of execution, and switches to the next mini-batch item (repeating until all threads are suspended), the full graph is known, and the neural network operating system 220 can optimize batching. This may lead to a speed-up of an order of magnitude or more compared to other approaches.

In one example embodiment, the neural network operating system 220 provides, via the user interface, pre-configured levels of a neural network. The neural network operating system may have pre-analyzed the pre-configured the levels and combined them into parallel processing sequences as described herein. Thus, the neural network operating system 220 may incentivize the user in creating a neural network that may be more easily optimized. In other embodiments, the graphical user interface provides sections of code that incorporates the pre-configured neural network levels.

In other example embodiments, the graph module 140 performs the operation combinations in real-time (e.g., during execution time either training or applying the neural network model 180).

Figure 8:
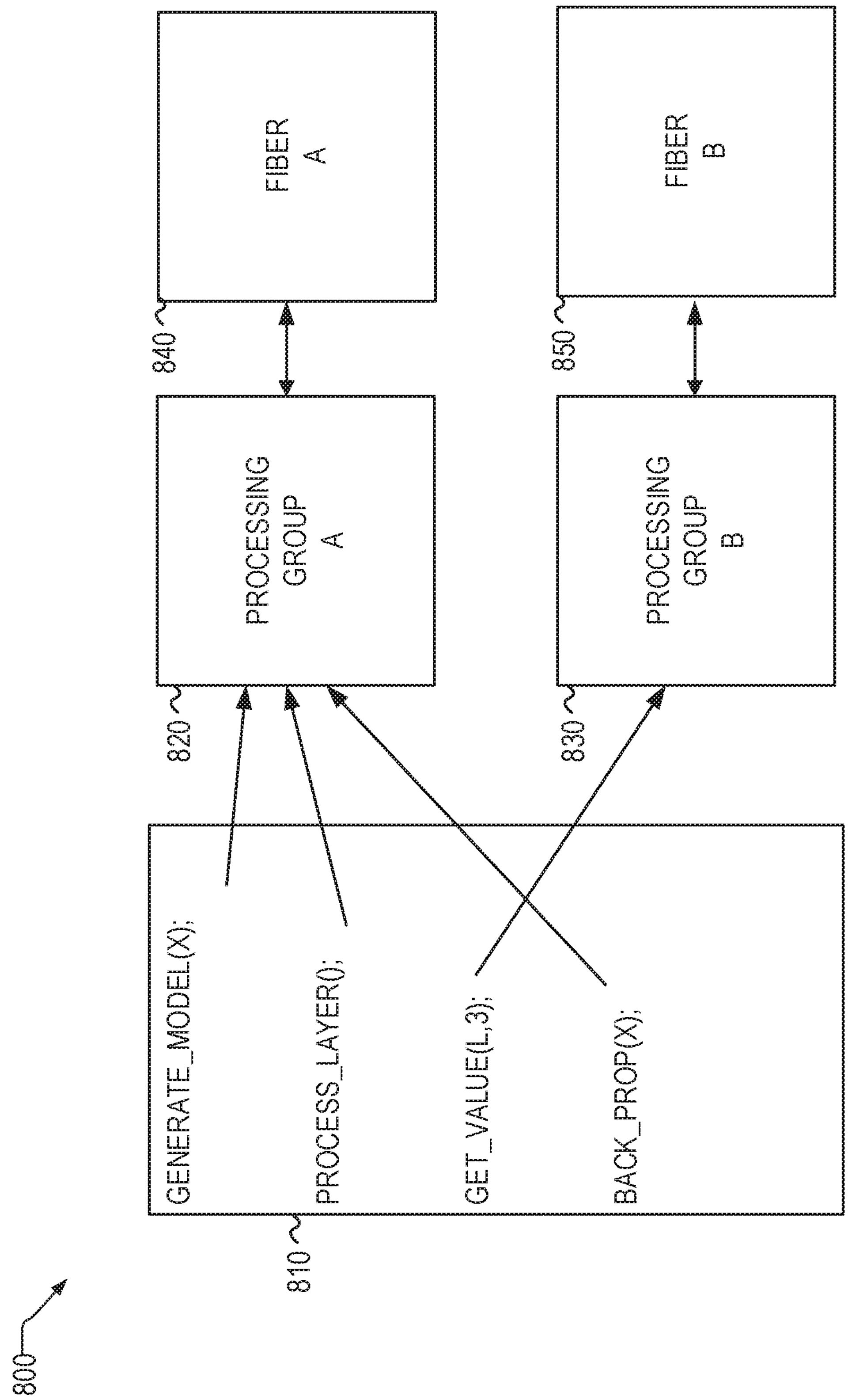
FIG. 8 is a block diagram illustrating arrangement of user operations, according to an example embodiment.

FIG. 8 is a block diagram illustrating arrangement of user operations, according to one example embodiment. In this example, the input code 810 includes a generate model command, a process layer command, a get value command, and a back propagation command. In this example, the generate model, process layer, and back propagation commands include calculations that directly affect the operation of the neural network model 180. Therefore, these operations are added to a first processing group A 820.

The get value command in the input code 810 is not integral in the operation of the neural network and is therefore added to a second processing group B 830. As previously described, the first processing group A 820 is performed in a first "fiber" A 840 and the second processing group B 830 is performed in a second "fiber" B 850.

Figure 9:
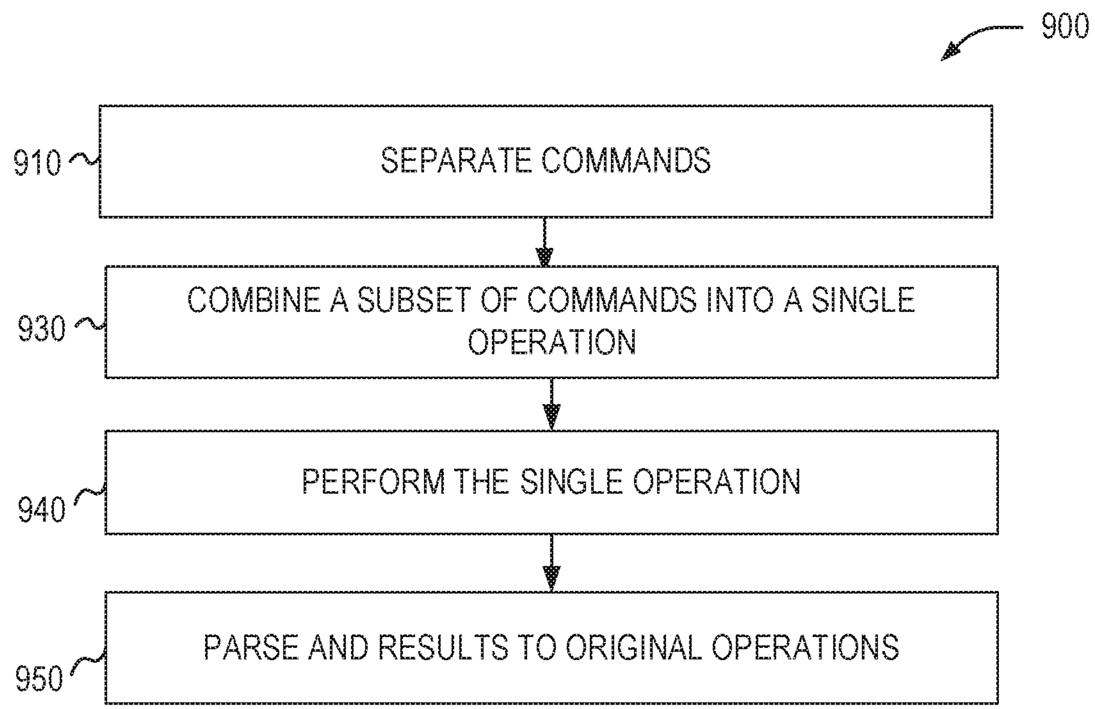
FIG. 9 is a flow chart diagram illustrating one method for operating a neural network, according to an example embodiment.

FIG. 9 is a flow chart diagram illustrating one method 900 for operating a neural network, according to one example embodiment. Operations in the method 900 may be performed by any of the modules described in FIG. 2, and are described by reference thereto.

In one example embodiment, the method 900 begins and at operation 910, the reader module 120 separates commands whose performance can be delayed from operations that are integral in operating a neural network. In one example, the reader module 120 looks up the commands in a database of commands, wherein database records indicate whether the respective commands are integral in operating the neural network or whether performance of the command could be delayed.

The method 900 continues at operation 930 and combining a subset of the commands that are integral in operating the neural network into a single processing sequence to be transmitted to an array of hardware processors;

The method 900 continues at operation 940 and the operating module 160 transmits the single processing sequence to the array of hardware processors. The method 900 continues at operation 950 and the operating module 160 parsing results of the single processing sequence to map results to the commands in the single processing sequence to the combined commands.

In one example embodiment, the neural network operating system 220 identifies a subset of commands whose performance can be delayed by looking up the commands in a database of commands. For example, a database of commands may store commands whose performance may be delayed without affecting the operation of the neural network and may also store commands that are integral in operating the neural network.

The neural network operating system 220 may look up each command in the user code and in response to the command being found in the database of commands whose execution can be delayed, identifies the command as such. Furthermore, in response to the command being found in the database of commands that are integral in operating the neural network, the neural network operating system 220 identifies the command as one that is integral in operating the neural network.

In one example embodiment, the neural network operating system 220 determines that removing a certain command would not impact operation of the neural network (e.g., a get_value command, value_output( ) command, or the like).

In another example embodiment, the neural network operating system combines commands selected from the set of commands in the user code that are integral in operating the neural network until a single processing sequence is full, or until a set of vector operations fill a matrix operation as described herein.

In one example embodiment, the operations are combined into a single processing sequence (e.g., a multi-dimensional single operation).

In one example embodiment, the neural network operating system 220 transmits a multi-dimensional single command to an array of hardware processors to be performed by calling a library command provided by a system managing the array of processors. In one example, an object for the array of processors is instantiated by the application performing the steps of the operation and memory•used by the single command is copied to memory that is accessible by the system managing the array of processors.

In another example embodiment, the neural network operating system 220 parses results of the multi-dimensional single command by copying out portions of the results according to how operations were combined. For example, where 10 10 dimension vectors were combined into a 10×10 matrix, individual rows or columns of a resulting 10×10 matrix are parsed out and attributed to the original vectors that were combined.

In one example embodiment, the neural network operating system 220 compares an amount of time saved by adding filler rows in the multi-dimensional single command with an amount of time necessary to add and calculate the values in the filler row, and adds the filler rows into the multi-dimensional single command in response to the time saved by adding the filler row being more than the time needed to add and calculate the values in the filler row.

In another example embodiment, the operations in the method 900 are performed in real-time. Thus, instead of determining which operations to combine while analyzing the user code, the neural network operating system 220 determines which operations or commands to combine during execution of the neural network In certain examples, during execution of the neural network means while either training the neural network or applying the neural network. For example, while classifying an image, or the like.

In one example embodiment, the neural network operating system 220 provides a set of pre-defined segments of code. In one example, a user may select a set of internal neural network layers and the neural network operating system 220 has pre-identified operations in the pre-defined segments of code whose performance can be delayed and other operations that are integral in operation of the neural network. In this scenario, the neural network operating system 220 identifies and defers performance of operations that are not integral in execution of the neural network prior to the user executing the user code.

In one example embodiment, the multi-dimensional single command is sized according to a number of processors available at the array of hardware processors. In one example, there are 256 processors in the array of processors and the neural network operating system 220 combines operations sufficient such that each of the 256 processors perform a calculation.

In another example embodiment, the commands that are integral in operating the neural network are transmitted (after being combined to fill a multi-dimensional single command) to the array of hardware processors in a first thread of execution and the subset of commands whose execution can be delayed are executed in a second thread of execution. In one example, the thread of execution is a fiber that executes as part of an application executing the neural network.

Figure 10:
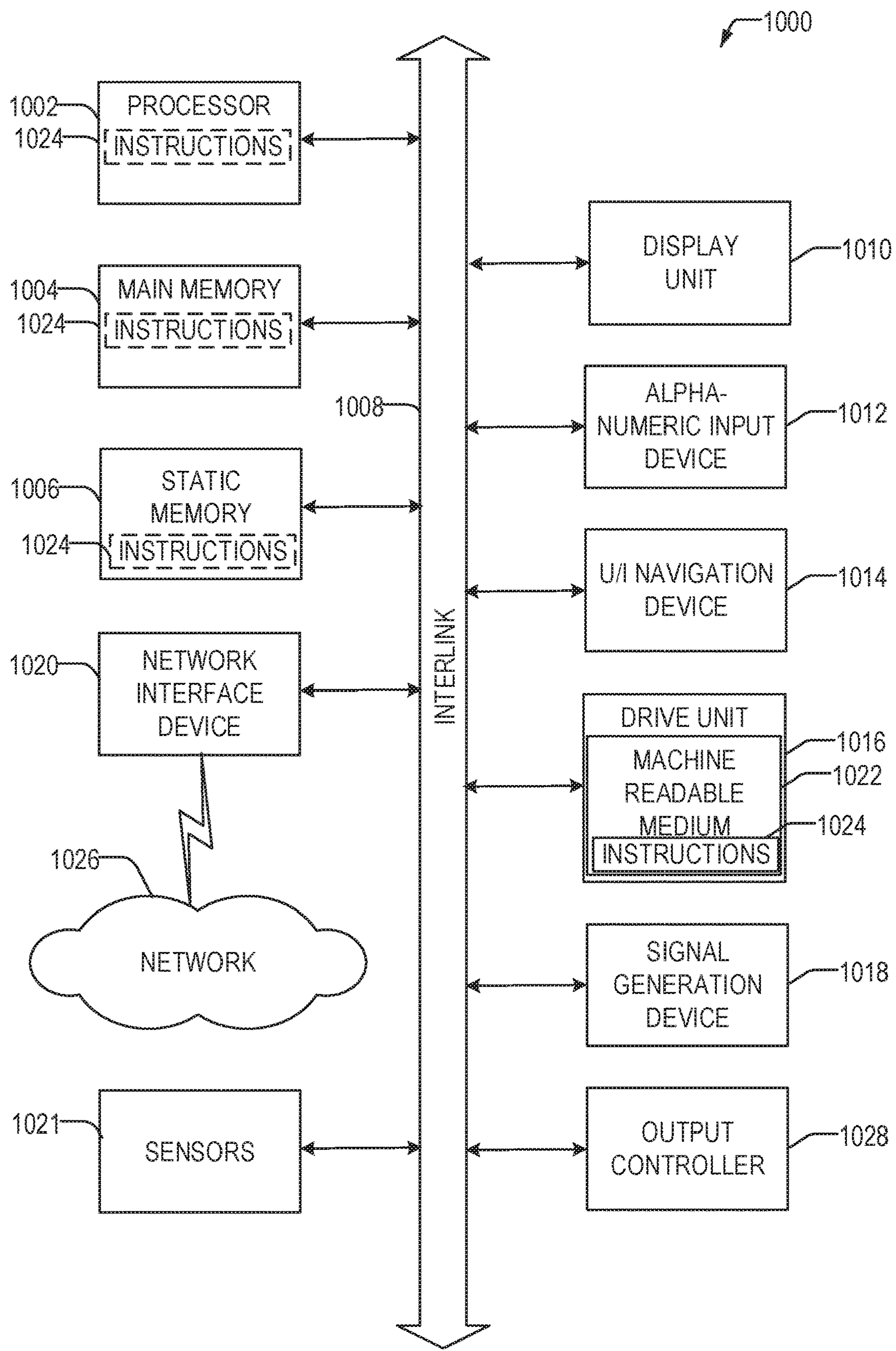
FIG. 10 is a block diagram illustrating an example of a machine upon which one or more embodiments may be implemented, according to some examples of the present disclosure.

FIG. 10 is a block diagram illustrating an example of a machine 1000 upon which one or more embodiments may be implemented, according to some examples of the present disclosure. The example machine 1000 may perform any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a computing device such as a server, a personal computer (PC), a tablet PC, a set-top box (STB), a personal digital assistant (PDA), a mobile telephone, a smart phone, a web appliance, a network router, a network switch, a network bridge, or any machine capable of executing instructions (sequential or otherwise) that specify actions to be taken by that machine. Additionally, the machine 1000 may implement any of the components of FIG. 2 and implement the methods of FIGS. 6-7. Further, while only a single machine is illustrated, the term "machine" shall also be taken to include any collection of machines that individually or jointly execute a set (or multiple sets) of instructions to perform any one or more of the methodologies discussed herein, such as by cloud computing, software as a service (SaaS), or other computer cluster configurations.

Examples, as described herein, may include, or may operate on, logic or a number of components, modules, applications, or mechanisms. Components, modules, applications, or mechanisms are tangible entities (e.g., hardware) capable of performing specified operations and may be configured or arranged in a certain manner. In an example, circuits may be arranged (e.g., internally or with respect to external entities such as other circuits) in a specified manner as components, modules, applications, or mechanisms. In an example, the whole or part of one or more computer systems (e.g., a standalone, client, or server computer system) or one or more hardware processors may be configured by firmware or software (e.g., instructions, an application portion, or an application) as components, modules, applications, or mechanisms that operate to perform specified operations. In an example, the software may reside on a machine-readable medium. In an example, the software, when executed by the underlying hardware of the component, module, application, or mechanism, causes the hardware to perform the specified operations.

Accordingly, the term "module," "component," "application," or "mechanism" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules, components, applications, or mechanisms are temporarily configured, each of them need not be instantiated at any one moment in time. For example, where the modules, components, applications, or mechanisms comprise a general-purpose hardware processor configured using software, the general-purpose hardware processor may be configured as respective different modules, components, applications, or mechanisms at different times. Software may accordingly configure a hardware processor, for example, to constitute a particular module, component, application, or mechanism at one instance of time and to constitute a different module, component, application, or mechanism at a different instance of time.

The machine (e.g., computer system) 1000 may include a hardware processor 1002 (e.g., a central processing unit (CPU), a graphics processing unit (GPU), a hardware processor core, or any combination thereof), a main memory 1004, and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012, and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 10.16 may constitute machine-readable media.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSDs); and CD-ROM and DVD-ROM disks. In some examples, machine-readable media may include non-transitory•machine-readable media. In some examples, machine-readable media may include machine-readable media that are not a transitory propagating signal.

The instructions 1024 may further be transmitted or received over a communications network 1026 using a transmission medium via the network interface device 1020. The machine 1000 may communicate with one or more other machines utilizing any one of a number of transfer protocols (e.g., frame relay, internet protocol (IP), transmission control protocol (TCP), user datagram protocol (UDP), hypertext transfer protocol (H.TTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long-Term Evolution (LTE) family of standards, a Universal Mobile Telecommunications System (UMTS) family of standards, and peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

OTHER NOTES AND EXAMPLES

In Example 1, subject matter includes a system for operating a neural network defined by user code, the system comprising: a hardware processor; and a memory, communicatively coupled to the processor and including instructions, which when performed by the processor, cause the system to perform operations comprising: identifying, while parsing the user code, a first subset of commands from the user code that operate the neural network and whose performance can be delayed; identifying, from commands not included in the first subset, a second subset of linear commands that can be combined into a multi-dimensional single command and including inputs to the combined commands in the multi-dimensional single command; transmitting the multi-dimensional single command to an array of hardware processors to be performed; and parsing results of the multi-dimensional single command to map results to the combined commands that were included in the second subset of linear commands.

In Example 2, the first subset of commands are performed in a separate thread of execution from the second subset of commands.

In Example 3, the operations further comprise: comparing an amount of time saved by adding filler rows in the multi-dimensional single command with an amount of time necessary•to add and calculate the values in the filler row; and adding the filler rows into the multi-dimensional single command in response to the time saved by adding the filler row being more than the time needed to add and calculate the values in the filler row.

In Example 4, the operations are performed in real-time during operation of the neural network.

In Example 5, The method of claim 1, wherein a portion of the user code is selected from pre-defined segments of code, the placing and identifying steps performed prior to executing the input code.

In Example 6, the method includes pre-allocating memory for the multi-dimensional single command according to a number of processors available in the array of hardware processors.

In Example 7, the second subset of commands include single dimensional vector multiplications and the multi-dimensional single command performs the vector calculations by a single multiplication of a two-dimensional matrix.

In Example 8, a machine-readable medium stores instructions which when performed by a machine, cause the machine to perform operations comprising: separating commands whose performance can be delayed from operations that are integral in operating a neural network; combining a subset of the commands that are integral in operating the neural network into a single processing sequence to be transmitted to an array of hardware processors; transmitting the single processing sequence to the array of hardware processors; and parsing results of the single processing sequence to map results to the commands in the single processing sequence.

In Example 9, the operations further comprise comparing an amount of time saved by adding filler rows in the single processing sequence with an amount of time necessary to add and calculate the values in the filler row; and adding the filler rows into the single processing sequence in response to the time saved by adding the filler row being more than the time needed to add and calculate the values in the filler row.

In Example 10, the operations of the method are performed in real-time while operating the neural network.

In Example 11, a portion of the input code is selected from pre-defined segments of code, the placing and identifying steps performed prior to a user completing the input code.

In Example 12, the operations include pre-allocating memory for the single processing sequence according to a number of processors available in the array of hardware processors.

In Example 13, the subset of commands that are integral in operating the neural network are transmitted to the array of hardware processors in a first thread of execution and the subset of commands whose execution can be delayed are executed in a second thread of execution.

In Example 14, the threads of execution are fibers configured as part of an application that is operating the neural network.

In Example 15, a computer-implemented method for operating a neural network defined by user code includes: identifying, while parsing user code, operations from the user code that are integral in operating the neural network; combining a subset of the identified operations into a single processing sequence to be transmitted to an array of hardware processors and including padding values that fill space left in the single processing sequence not occupied by the subset of identified operations; performing operations that are not integral in operation of the neural network in a separate thread of execution from the operations that are integral in operating the neural network; parsing results of the single processing sequence; and mapping results to the combined operations that were included in the single processing sequence.

In Example 16, the thread of execution is an application fiber.

In Example 17, adding the padding values is in response to an amount of time saved by adding the padding values exceeding an amount of time necessary to process the padding values in the single processing sequence.

In Example 18, the steps of the method are performed in real-time during operation of the neural network model.

In Example 19, a portion of the input code is selected from pre-defined segments of code, the identifying step are performed prior to execution of the user code.

In Example 20, the method includes pre-allocating memory for the single processing sequence according to a number of processors available in the array of hardware processors.

What is claimed is:

1. A system for operating a neural network defined by user code, the system comprising:

a hardware processor; and a memory, communicatively coupled to the processor and including instructions, which when performed by the processor, cause the system to perform operations comprising:

identifying, while parsing the user code, a first subset of commands from the user code that operate the neural network and whose performance can be delayed;

identifying, from commands not included in the first subset, a second subset of linear commands that can be combined into a multi-dimensional single command and including inputs to the combined commands in the multi-dimensional single command;

transmitting the multi-dimensional single command to an array of hardware processors to be performed;

parsing results of the multi-dimensional single command to map results to the combined commands that were included in the second subset of linear commands; and pre-allocating memory for the multi-dimensional single command according to a number of processors available in the array of hardware processors.

2. The system of claim 1, wherein the first subset of commands are performed in a separate thread of execution from the second subset of commands.

3. The system of claim 1, wherein the operations further comprise: comparing an amount of time saved by adding filler rows in the multi¬dimensional single command with an amount of time necessary to add and calculate the values in the filler row; and adding the filler rows into the multi¬dimensional single command in response to the time saved by adding the filler row being more than the time needed to add and calculate the values in the filler row.

4. The system of claim 1, wherein the operations are performed in real-time during operation of the neural network.

5. The system of claim 1, wherein a portion of the user code is selected from pre-defined segments of code, the identifying steps performed prior to executing the input code.

6. The system of claim 1, wherein the second subset of commands include single dimensional vector multiplications and the multi-dimensional single command performs the vector calculations by a single multiplication of a two-dimensional matrix.

7. A tangible storage device that stores instructions which when performed by a machine, cause the machine to perform operations comprising:

separating commands whose performance can be delayed from operations that are integral in operating a neural network;

combining a subset of the commands that are integral in operating the neural network into a single processing sequence to be transmitted to an array of hardware processors:

transmitting the single processing sequence to the array of hardware processors;

parsing results of the single processing sequence to map results to the commands in the single processing sequence; and pre-allocating memory for the single processing sequence according to a number of processors available in the array of hardware processors.

8. The tangible storage device of claim 7, wherein the operations further comprise comparing an amount of time saved by adding filler rows in the single processing sequence with an amount of time necessary to add and calculate the values in the filler row; and adding the filler rows into the single processing sequence in response to the time saved by adding the filler row being more than the time needed to add and calculate the values in the filler row.

9. The tangible storage device of claim 7, wherein the operations of the method are performed in real-time while operating the neural network.

10. The tangible storage device of claim 7, wherein a portion of the input code is selected from pre-defined segments of code, the identifying steps performed prior to a user completing the input code.

11. The tangible storage device of claim 7, wherein the subset of commands that are integral in operating the neural network are transmitted to the array of hardware processors in a first thread of execution and the subset of commands a hose execution can be delayed are executed in a second thread of execution.

12. The tangible storage device of claim 11, wherein the threads of execution are fibers configured as part of an application that is operating the neural network.

13. A computer-implemented method for operating a neural network defined by user code, the method comprising:

identifying, while parsing user code, operations from the user code that are integral in operating the neural network;

combining a subset of the identified operations into a single processing sequence to be transmitted to an array of hardware processors and including padding values that fill space left in the single processing sequence not occupied by the subset of identified operations;

performing operations that are not integral in operation of the neural network in a separate thread of execution from the operations that are integral in operating the neural network;

parsing results of the single processing sequence to map the results to the combined operations that were included in the single processing sequence.

14. The computer-implemented method of claim 13, wherein the thread of execution is an application fiber.

15. The computer-implemented method of claim 13, wherein adding the padding values is in response to an amount of time saved by adding the padding values exceeding an amount of time necessary to process the padding values in the single processing sequence.

16. The computer-implemented method of claim 13, wherein the steps of the method are performed in real-time during operation of the neural network model.

17. The computer-implemented method of claim 13, wherein a portion of the input code is selected from predefined segments of code, the identifying step is performed prior to execution of the user code.

18. The computer-implemented method of claim 13, further comprising pre-allocating memory for the single processing sequence according to a number of processors available in the array of hardware processors.

* * * * *